(12) United States Patent
Chandra

(10) Patent No.: US 7,099,536 B1
(45) Date of Patent: Aug. 29, 2006

(54) SINGLE LENS SYSTEM INTEGRATING BOTH TRANSMISSIVE AND REFLECTIVE SURFACES FOR LIGHT FOCUSING TO AN OPTICAL FIBER AND LIGHT REFLECTION BACK TO A MONITOR PHOTODETECTOR

(75) Inventor: Haryanto Chandra, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 226 days.

(21) Appl. No.: 10/731,376

(22) Filed: Dec. 8, 2003

(51) Int. Cl.
*G02B 6/32* (2006.01)
(52) U.S. Cl. .............................. 385/33; 385/88; 385/89
(58) Field of Classification Search .................. 385/31, 385/33–35, 88–94
See application file for complete search history.

(56) References Cited

U.S. PATENT DOCUMENTS

| | | | |
|---|---|---|---|
| 4,753,520 A | * | 6/1988 | Silverglate .................. 359/365 |
| 6,793,406 B1 | * | 9/2004 | Edwards et al. ............... 385/88 |
| 6,921,214 B1 | * | 7/2005 | Wilson ......................... 385/89 |
| 6,937,791 B1 | * | 8/2005 | Guy ............................. 385/33 |
| 2004/0175072 A1 | * | 9/2004 | Lam et al. ..................... 385/33 |

OTHER PUBLICATIONS

"*LC Connected High Speed VCSEL 2.5 Gbps*", HFE419x-521, Fiber Optic LAN Components, Honeywell, http://www.honeywell.com/sensing/VCSEL, 4 pages.

Emcore Product Sheet, www.emcore.com, p. 2, Mar. 2003.

* cited by examiner

*Primary Examiner*—Kevin S. Wood
(74) *Attorney, Agent, or Firm*—Beyer Weaver & Thomas, LLP

(57) ABSTRACT

An integrated lens and mirror assembly for use in a fiber optic transmitter optical sub-assembly is disclosed. The lenses fabricated from a single monolithic block of optically transparent material. One region of the lens assembly is configured to transmit and focus light signals. A second region of the lens assembly is configured to reflect a portion of the light and focus it to a monitoring photodetector unit.

24 Claims, 3 Drawing Sheets

SINGLE LENS SYSTEM INTEGRATING BOTH TRANSMISSIVE AND REFLECTIVE SURFACES FOR LIGHT FOCUSING TO AN OPTICAL FIBER AND LIGHT REFLECTION BACK TO A MONITOR PHOTODETECTOR

FIELD OF THE INVENTION

The present invention relates generally to fiber optic transceiver modules, and more particularly, to lens/mirror configurations within fiber optic transmitter optical sub-assembly (often referred to as T-OSA) modules.

BACKGROUND OF THE INVENTION

In conventional fiber optic transceiver modules, it is common to use a photodetector to monitor the output of the transmitting laser. Usually, the transmitting laser beam is partially reflected back onto the photodetector by way of a semi-transmissive mirror (also known as a semi-reflective window.) The mirror is placed between the laser and the focusing lens such that the light from the laser hits the mirror first, thus reflecting a portion of the light onto the photodetector. This reflected light is sensed by the photodetector and used to provide feedback to the laser driver. In this manner, it is possible to monitor the power output of the laser and adjust it to compensate for variations in laser output power due to, for example, temperature changes in the environment in which the laser is operating. The light that is not reflected travels through the mirror and strikes the lens, where it is focused on an optical fiber. This type of construction is especially true for most fiber optic transceivers using surface emitting lasers such as VCSELs.

There are currently several known configurations used by fiber optic transceiver module manufacturers in placing the mirror relative to the optical axis (i.e. in the direction of the propagated light) of the module. In a first known configuration, the surface of the semi-transmissive mirror is located between the laser and the lens such that light strikes the mirror normally (i.e. perpendicular to the optical axis.) Light reflecting off a mirror in this configuration will be directed back towards the laser source. Consequently, the monitor photodetector must normally be placed under the laser. Also, in this configuration, reflected light will strike the laser source as well as the monitor photodetector. This light from the laser reflecting back to the same laser is normally undesirable and may cause increased noise (normally referred to as Relative Intensity Noise or RIN for short) in the transmission signals. Another disadvantage is that since part of the reflected light will strike the laser and that the laser is normally placed on top of the photodetector, not all the reflected light gets to the monitor photodetector (leading to reduced efficiency).

In a second known configuration, the semi-transmissive mirror may be placed at an angle to the optical axis. In this configuration, light reflecting off the mirror will be directed away from the laser source and onto the monitor photodetector, which is normally located next to the laser source, and the distance between the two depends on the angle of the mirror. One disadvantage of this configuration is that the monitor photodetector must be made larger in order to capture all the reflected light. However, this is normally difficult to achieve.

A disadvantage of conventional designs of fiber optic transmitter optical sub-assembly (or T-OSA) is in the complexity of the mirror and lens assembly, e.g., normally, the mirror and the lens must be positioned separately. Another disadvantage is in the relatively large size of current assembly modules, due in part to the need for a relatively large monitor photodetector.

Therefore, an integrated focusing lens and reflector that reduces the number of process steps, improves assembly tolerance, is more tolerant to temperature change, better controls and focuses reflected light to a monitor photodetector, and provides a significantly smaller lens/reflector system, is needed.

SUMMARY OF THE INVENTION

To achieve the foregoing, and in accordance with the purpose of the present invention, an integrated focusing lens and mirror is disclosed. The integrated structure includes a lens fabricated from a single monolithic block of optically transparent material and can be injection-molded out of a plastic or a polymer material such as Ultem® materials made by GE Plastics. The lens includes a transmissive region (at the center of the lens/mirror system) that is designed to focus light from a laser source onto an optical fiber. The lens also includes a reflective region that is designed to reflect the light falling outside of the center transmisive region (i.e. farther away from the center of the lens/mirror systen) back to a monitor photodetector. The outer portion of the lens can be made reflective by coating the surface with a reflective material.

In another embodiment, a plurality of lenses are grouped together, where each lens is formed from a separate monolithic block and one portion of each lens has a transmissive region and the other portion has reflective region. Alternately, the entire group of lenses may be formed from a single monolithic block.

BRIEF DESCRIPTION OF THE DRAWINGS

The invention, together with further advantages thereof, may best be understood by reference to the following description taken in conjunction with the accompanying drawings in which:

FIG. 1b illustrates a perspective view of the lens system shown in 1a.

DETAILED DESCRIPTION OF THE INVENTION

While the present invention will be described with reference to a few specific embodiments, the description is illustrative of the invention and not to be construed as limiting the invention. The various modifications to the present invention can be made to the preferred embodiments by those skilled in the art without departing from the true spirit and scope of the invention as defined by the appended claims.

The present invention pertains to a lens system for use in a fiber optic transceiver module or any optical systems where optical feedback from a source to a monitoring detector is necessary.

Figure 1A:
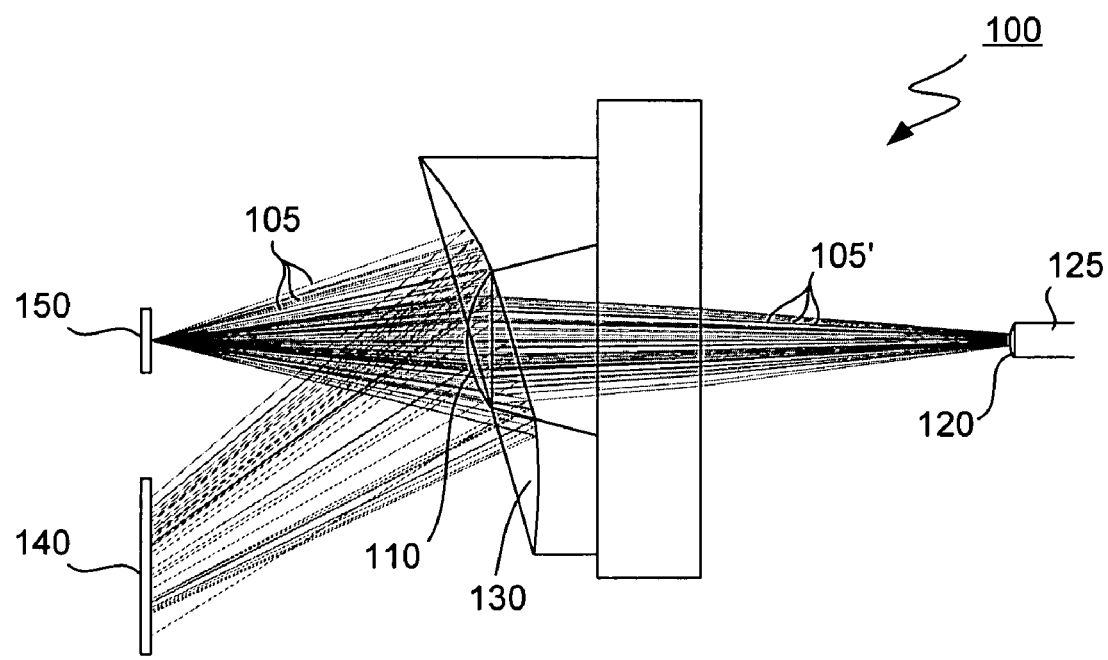
FIG. 1a illustrates a side view of a lens system according to the present invention.
Figure 1B:
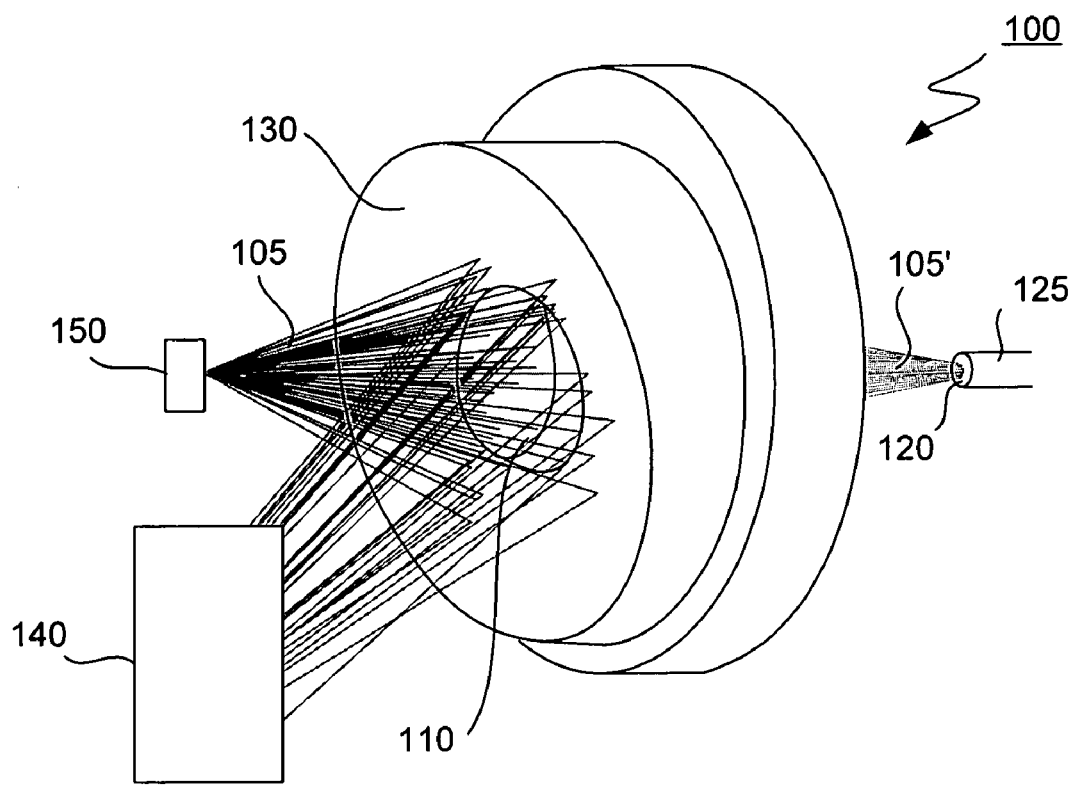

One embodiment of the present invention is shown in a side view in FIG. 1a and a perspective view in FIG. 1b. A lens 100 and a light source 150 are configured such that a light beam from light source 150 is directed towards lens 100. Lens 100 is fabricated from a single, monolithic block of transparent material. Lens 100 has a reflective region 130 that surrounds a transmissive region 110. Light source 150 (i.e., a solid-state laser such as VCSEL) generates a divergent light beam, which for the purposes of this application, will be described in terms of the paths of individual light rays 105. Light source 150 is arranged in relation to lens 100 such that individual light rays 105 strike either transmissive region 110 or reflective region 130. Light rays 105 that strike transmissive region 110 are focused by lens 100. Focused light rays 105' are shown striking the end face 120 of an optical fiber 125.

Light rays 105 that strike reflective region 130 are reflected towards a photodetector 140. In FIGS. 1a and 1b, reflective region 130 is curved in order to focus the reflected light onto a small area. The curvature of reflective region 130 allows the use of a smaller photodetector then would be possible using a flat reflective region, which would not focus the reflected light. It is understood that reflective region 130 may or may not be curved and that photodetector 140 may be found in other locations then shown in FIG. 1a. For example, in alternate embodiments of the invention (not shown), reflective region 130 is substantially flat.

As noted above, lens 100 is preferably constructed of a single piece of a substantially transmissive material. The material may be glass, fused silica, plastics, silicon, etc. However, the foregoing list is not intended to be exhaustive, and persons having ordinary skill will recognize that other materials are possible. Additionally, while single piece construction is preferred, the lens may be made up of multiple smaller pieces.

In FIGS. 1a and 1b, the radially centered region of lens 100 remains transmissive, while the region surrounding transmissive region 110 is made reflective. Other configurations are possible, such as where the curved transmissive surface is on the opposite side of the reflective surface, as will be recognized by those skilled in the art.

Various well-known procedures may be used to create reflective region 130, for example sputtering, coating, etc. Additionally, various reflective materials such as metals may be used.

Figure 2:
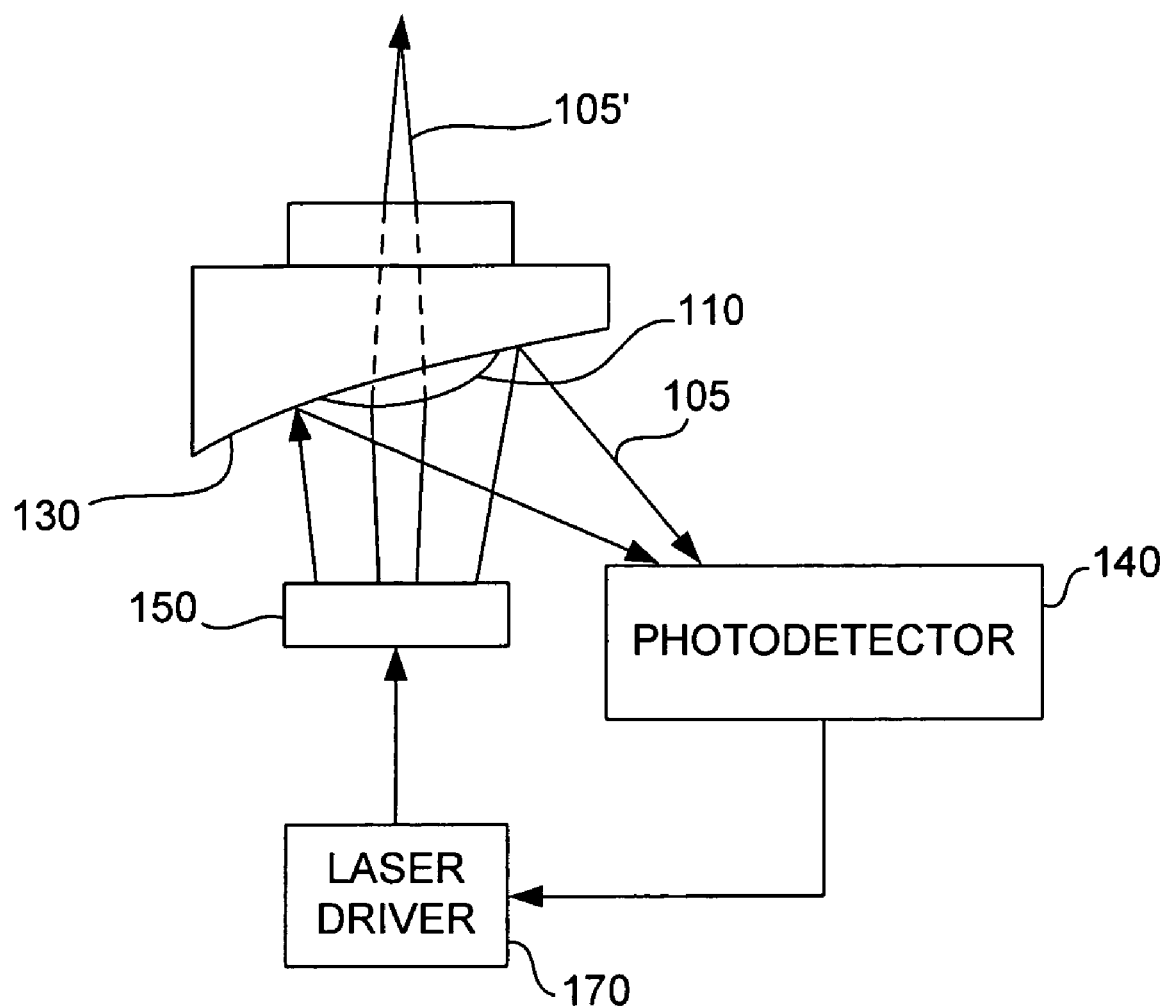
FIG. 2 illustrates a simple control circuit used to drive and control the output power a light source (i.e. laser).

FIG. 2 illustrates a block diagram of a control circuit used to drive and control the output power of a light source.

A light source 150, for example a VCSEL, is connected and driven by a laser driver IC 170. Light source 150 generates a divergent light beam, which for the purposes of this application, will be described in terms of the paths of individual light rays 105. Light rays 105 either strike reflective region 130 or transmissive region 110. The reflected light rays 105' strike a photodetector 140 that converts the reflected light 105' into an electrical signal, and sends this signal to a control feedback circuit that is part of the laser driver circuitry 170 that, in turn, controls the amount of current that laser driver 170 supplies to light source 150.

In one embodiment of the invention, light source 150, lens 100, photodetector 140, and the control circuit of FIG. 2 are all contained in a single package or housing (not shown). The housing has an opening or receptacle at one end to receive a fiber optic cable and pins or leads connection for connecting to other outside circuitry. In another embodiment, light source 150, lens 100, and photodetector 140 of FIG. 2 excluding laser driver 170 are contained in a single package (not shown). In this embodiment, laser driver 170 normally resides on a separate printed circuit board (PCB).

One advantage of the invention as described in FIGS. 1a–b and 2 is a reduction in size over conventional fiber optic transceiver modules. There are also fewer parts in each module since the mirror (reflective region) and the lens are integrated. Referring again to FIG. 1a, it is apparent that reflective region 130 is curved so as to focus reflected light, making it possible to use a smaller monitor photodetector 140, further reducing the overall size of the module. Because lens system 100 is fabricated as a single piece, it is possible to produce higher quality fiber optic transceiver modules at a lower cost. Also, unlike most conventional lenses arrangements in fiber optic transmitters where there is no way to control the size of the beam striking the lens (no aperture), the present invention has the advantage of a fixed window aperture. By way of explanation, looking at FIG. 1b, it is clear that reflective region 130 acts as an aperture by controlling the size of the beam that enters transmissive region 110.

Figure 3:
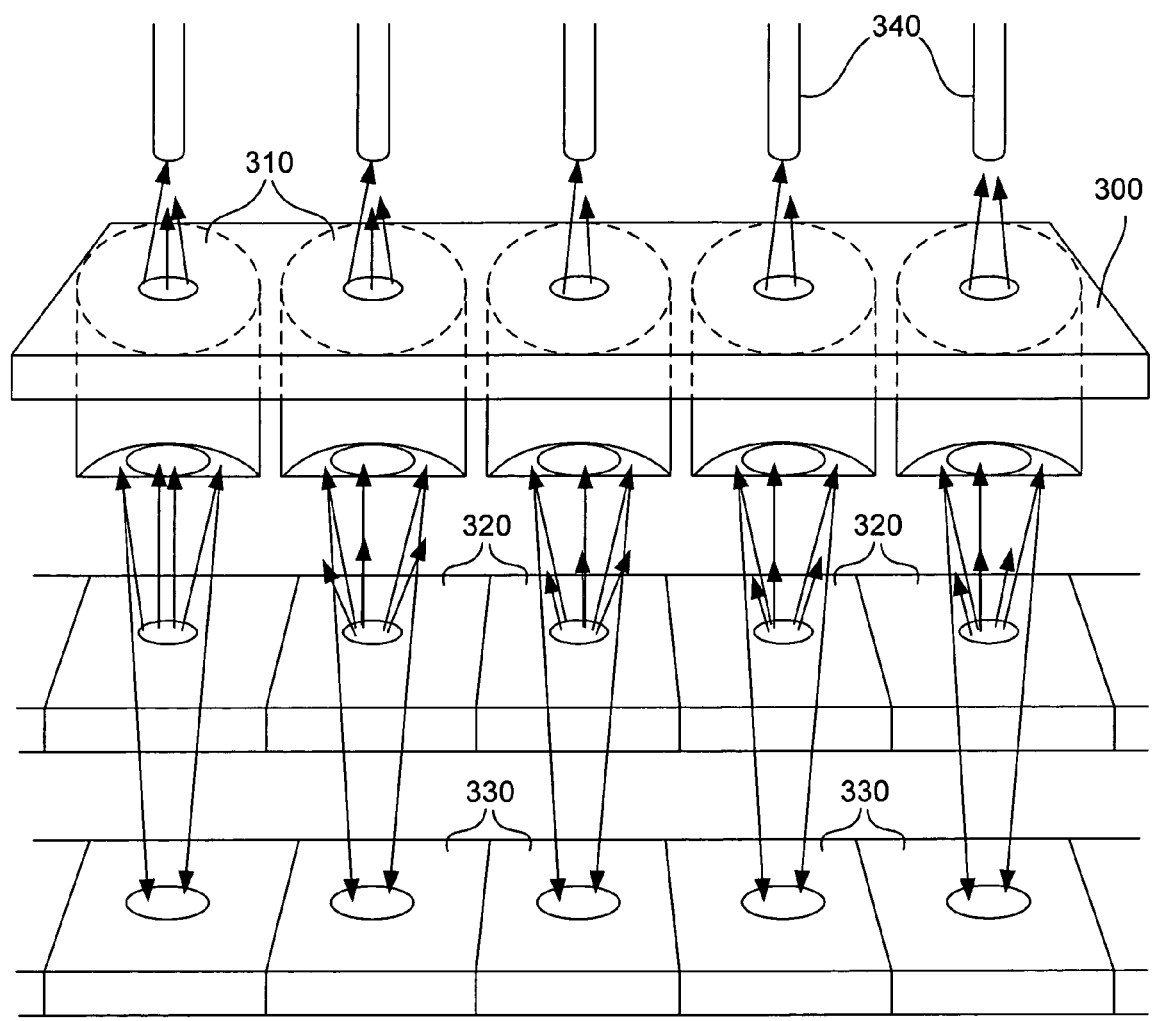
FIG. 3 illustrates a side view of an array of lenses according to one aspect of the present invention.

A module containing an array of lens systems and associated light source array and monitor photodetector array is shown in FIG. 3. Lens array 300 is constructed of two or more lenses 310, each lens 310 preferably of the type described in FIG. 1a, above. Each lens 310 is associated with a corresponding light source 320, and a corresponding photodetector 330. Furthermore, light from each light source 320 is focused on a corresponding fiber optic cable 340. Light sources 320 are laser diodes, such as VCSELs. Lens array 300 is formed from a single monolithic block of optically transparent material. However, other configurations are possible, as will be recognized by those skilled in the art. Fiber optic modules using an array system are commonly referred to as parallel optic transceivers.

Although the foregoing invention has been described in some detail for purposes of clarity of understanding, it will be apparent that certain changes and modifications may be practiced within the scope of the appended claims. For example, different shaped lenses, different configurations of multi-lens modules, and various implementations of control feedback circuitry. Therefore, the described embodiments should be taken as illustrative and not restrictive, and the invention should not be limited to the details given herein but should be defined by the following claims and their full scope of equivalents

What is claimed is:

1. An apparatus, comprising:
   a lens fabricated from a single monolithic block of optically transparent material and configured to be used in a fiber optic transmitter, the lens including:
   a transmissive region configured to transmit and focus light signals received from a light emitting source onto a fiber optic cable when the lens is used in the fiber optic transmitter; and
   a reflective region surrounding the transmissive region of the lens, the reflective region configured to reflect a portion of the light signal received at the lens/mirror surface away from the fiber optic cable;
   the transmissive region and the reflective region being integrated and formed from the single monolithic block.

2. The apparatus of claim 1, wherein the transmissive region is substantially circular in aperture, and can have spherical or aspherical surface curvature.

3. The apparatus of claim 1, wherein the reflective region is curved in order to focus the reflected light away from the fiber optic cable onto a predesignated location.

4. The apparatus of claim 1, wherein the reflective region is fabricated by applying a light-reflective material onto the single monolithic block in the regions where the reflective region of the lens is to be formed.

5. The apparatus of claim 4, wherein the process used to apply the light reflective material is one of but not limited to one of the following methods: metal sputtering or reflective coating.

6. The apparatus of claim 1, wherein the single monolithic block is made from one of but not limited to one of the following materials: glass, fused silica, quartz, or plastics.

7. The apparatus of claim 1, further comprising a photodetector positioned to receive reflected light reflected off of the reflective region when light signals are received at the lens from the light-emitting source.

8. The apparatus of claim 7, further comprising a light source, the lens including the transmissive region surrounding the reflective region, the package further comprising a photodetector chip, and a protective enclosure.

9. The apparatus of claim 8, further comprising a receptacle for the purpose of providing optical connection to the outside world by aligning and holding firmly the end of a fiber optic cable.

10. The apparatus of claim 9, further comprising an electrical connection to the outside world through pins or leads or any other means to connect to outside circuitry.

11. The apparatus of claim 10, further comprising a fiber optic cable and an optical receiver.

12. An apparatus, comprising:
an array of lenses, each lens in the array or the whole array fabricated from a single monolithic block of optically transparent material and configured to be used in a fiber optic transmitter, each lens including:
a transmissive lens region configured to transmit and focus light signals received from a corresponding light emitting source to a corresponding fiber optic cable when the lens is used in the fiber optic transmitter;
a reflective region surrounding the transmissive region of each lens, each reflective region configured to reflect a portion of the light signal received at each lens away from the corresponding fiber optic cable respectively; and
the transmissive regions and the reflective regions of each lens being integrated and formed from the single lens array block.

13. An apparatus, comprising:
an array of lenses fabricated from a single monolithic block of optically transparent material and configured to be used in a fiber optic transmitter, the array including:
a plurality of transmissive lens regions configured to transmit and focus light signals received from a plurality of corresponding light emitting sources to a plurality of corresponding fiber optic cables when each lens is used in the fiber optic transmitter;
a plurality of reflective regions surrounding each of the transmissive regions of each lens respectively, the reflective regions configured to reflect a percentage of the light signal received at each lens away from the corresponding fiber optic cable respectively; and
the transmissive regions and the reflective regions being integrated and formed from the single monolithic block.

14. The apparatus of claim 13, wherein the transmissive regions are substantially circular in aperture.

15. The apparatus of claim 14, wherein the reflective regions substantially surround the transmissive regions.

16. The apparatus of claim 15, wherein the transmissive regions and reflective regions are substantially coplanar, respectively.

17. The apparatus of claim 16, wherein the reflective regions are curved in order to focus reflected light onto corresponding surfaces.

18. The apparatus of claim 17, wherein the reflective regions are fabricated by applying a light reflective material onto the single structure in the regions where the reflective regions of the structure are to be formed.

19. The apparatus of claim 18, wherein process used to apply the light reflective material is one of but not limited to one of the following methods: metal sputtering or reflective coating.

20. The apparatus of claim 19, wherein the single monolithic structure is made from one of but not limited to one of the following materials: glass, fused silica, quartz, or plastics.

21. The apparatus of claim 20, further comprising a plurality of photodetectors positioned to receive reflected light reflected off of the reflective regions when light signals are received at any of the plurality of lenses from the light-emitting sources.

22. The apparatus of claim 21, further comprising a receptacle for the purpose of providing an optical connection to outside circuitry by aligning and holding the ends of a plurality of fiber optic cables.

23. The apparatus of claim 22, further comprising a housing for the plurality of lenses, light sources, monitor photodetectors, and the cable receptacle.

24. The apparatus claim 13, wherein the array of lenses lens array is fabricated from a single monolithic block of optically transparent material.

* * * * *